United States Patent [19]
Rijnten et al.

[11] 3,997,475
[45] Dec. 14, 1976

[54] SUPPORTED NICKEL CATALYST

[75] Inventors: Hendrik Theodorus Rijnten, Maasland; Pieter Scherpenisse, Maassluis, both of Netherlands

[73] Assignee: Lever Brothers Company, New York, N.Y.

[22] Filed: July 25, 1975

[21] Appl. No.: 599,205

Related U.S. Application Data

[63] Continuation of Ser. No. 442,969, Feb. 15, 1974, abandoned.

[52] U.S. Cl. .................................. 252/459; 252/472
[51] Int. Cl.² .................... B01J 29/10; B01J 23/40
[58] Field of Search ............................ 252/459, 472

[56] References Cited

UNITED STATES PATENTS

| | | | |
|---|---|---|---|
| 3,652,458 | 3/1972 | Gobron et al. | 252/459 X |
| 3,673,115 | 6/1972 | Linsen et al. | 252/459 |

*Primary Examiner*—Carl F. Dees
*Attorney, Agent, or Firm*—Kenneth F. Dusyn; James J. Farrell; Melvin H. Kurtz

[57] ABSTRACT

A process for the preparation of a supported nickel catalyst in which an intimate mixture of a suspension of carrier material in aqueous nickel salt solution, a substantially water-insoluble organic base and a stronger inorganic base are used to precipitate nickel hydroxide on to the carrier material.

7 Claims, No Drawings

SUPPORTED NICKEL CATALYST

This is a continuation of application Ser. No. 442,969, filed Feb. 15, 1974 now abandoned.

BACKGROUND OF THE INVENTION

The invention relates to a process for the preparation of a supported nickel catalyst, especially to a process in which the nickel is precipitated from an aqueous solution of a nickel salt in the form of nickel hydroxide on a carrier material suspended in the solution, after which the solid material is separated from the aqueous solution. The invention also relates to the catalysts prepared by this process and to their use in catalytic processes.

Supported nickel catalysts have been known in the art for many years. They are applied in numerous hydrogenation reactions, their application in the catalytic hydrogenation of fatty products, such as fatty alcohols, fatty acids and fatty acid esters, in particular triglycerides containing one or more double bonds, being particularly important. It has been recognized that the effectiveness of such catalysts is dependent on a number of different properties, such as activity, resistance to poison, resistance to sintering and selectivity.

If the catalyst is to possess a high activity, it is desirable for the catalyst to have a large specific metal surface (surface per unit of weight of the catalyst), which is easily accessible to the reaction components. This is the case when the catalytic agent is evenly distributed over all the surfaces of the carrier material in the form of very fine particles or as a thin layer.

The amount of catalyst used during a certain reaction is dependent on the degree to which the catalyst is inactivated by the deposit of undesired substances from the reaction medium on the surface of the catalyst, and it will be clear that this resistance to poison is largely determined by the specific surface of the catalyst.

In many cases these catalysts will be subjected to a high temperature, either before use in an activation process and/or during their use in a catalytic process and/or in regenerating them after use in such a process, and it is therefore of importance for them to be stable under such conditions.

The resistance to sintering is in the first place dependent on the type of catalytically active agent and on the carrier material used, but it is also influenced by the way in which the catalyst is prepared.

With such supported nickel catalysts the activity is also dependent on the amount of metal compounds that will be reduced during the activation process. This amount is in the first place dependent on the physical and chemical condition in which the metal is present on the carrier surface. Moreover the resistance to sintering again plays an important part in this connection. For in general the degree of reduction to be achieved will be higher as the reduction is carried out at a higher temperature. With catalyst masses which have a great resistance to sintering and which therefore can be reduced at relatively high temperatures, a higher degree of reduction will be attained than with catalyst masses showing a less high resistance to sintering.

Alternatively, most problems regarding sintering can be avoided, if it is possible to prepare compositions which can be reduced completely, or at least to a high degree, at a relatively low temperature.

With various catalytic processes it is of importance for the catalysts used to have a great selectivity. Thus in hydrogenation processes in which two or more double bonds are successively hydrogenated, it is important that the hydrogenation can be carried out stepwise, so that partly hydrogenated compounds can be prepared without higher saturated compounds being formed. Such a selectivity is in the first place dependent on the nature of the catalytically active agent. Thus nickel in the above-mentioned hydrogenation of triglyceride esters of unsaturated fatty acids has a so-called "oleic acid" selectivity, which means that the polyunsaturated fatty acids, such as linolenic acid and linoleic acid, can be hydrogenated to mono-unsaturated acids (in this case oleic acid) without the latter being appreciably further hydrogenated to the completely saturated fatty acid (stearic acid). This selectivity can be promoted still further by a proper choice of the reaction conditions. Further this selectivity is also dependent on the structure of the carrier material. In general it increases with the pore size of the carrier material and preferably catalyst carrier will be used in this reaction of which the greater part of the pores has a diameter of at least 25 A, preferably even of at least 80 A. In other hydrogenation reactions, e.g. the hydrogenation of free fatty acids, carrier material with narrow pores appears to be favourable.

In the preparation of the above-mentioned catalysts it is of importance to use such a process that one starts from carrier material with the desired pore size and that during the processes used this pore structure is retained as much as possible.

Finally it should be observed that with most industrial processes it is important for the catalyst to be recovered in a simple way. For this reason catalysts applied in wet processes should possess good filtration properties, so that they can be separated from the reaction medium by simple filtration or centrifugation.

PRIOR ART

In the literature a large number of methods has been described for the preparation of such supported nickel catalysts.

In a very simple process the nickel is precipitated in the form of an insoluble compound, such as an oxide, hydroxide, carbonate, basic carbonate and the like, from an aqueous solution of one of its salts by adding to the solution an aqueous solution of a basic compound, such as alkali hydroxide or carbonate, or ammonia. In this connection it has been found that, in order to precipitate the insoluble compound in a suitable form, the precipitation reaction should take place at relatively high temperatures, preferably between 90° and 100° C. The precipitate formed is subsequently filtered off and, if necessary after drying, intimately mixed with the carrier material, after which the mass obtained is activated. It is clear that, as far as the catalytically active agent will still be attached to the carrier material in this process in a later stage, this attachment takes place mainly on the external surface and only to a slight degree on the internal surface of the pores. Attempts have been made to overcome this disadvantage by precipitating the metal in the presence of the carrier, but under these circumstances only part of the insoluble compound is precipitated on the carrier material, and of that the main part is precipitated on the external surface. The latter method moreover has the disadvantage that during precipitation the carrier material is exposed to the influence of the hot alkaline solution, which with the use of silica as carrier material results in a deterioration of the surface structure.

It has been found that the above-mentioned processes, particularly if they are applied on an industrial scale, are in general difficult to control and yield catalysts of varying qualities. True, it is possible to improve this by applying certain measures, by which the carrier mass remains in contact with the hot alkaline solution as briefly as possible, and/or by which the precipitation is carried out at a constant pH, but the previously mentioned disadvantages are only partially removed in this way. Besides, in all the processes mentioned above the desired even distribution of the catalytically active agent over all the surfaces of the carrier material is not or only partly achieved.

In another process the carrier material is impregnated with an aqueous solution of a suitable nickel salt, after which the impregnated mass is dried and subsequently heated to a higher temperature with decomposition of the salt and formation of the metal oxide. Also in this process no even distribution of the catalytically active agent over the carrier material is achieved, because of the diffusion of the dissolved salt to the external surface during drying.

In another process the nickel is precipitated on the carrier material by boiling a suspension of this material in a solution of nickel in ammonia, thus evolving the ammonia while liberating nickel ions, and precipitating the nickel as hydroxide in the form of fine particles over the whole surface of the carrier material, including the internal surface. This process, however, has the disadvantage that it is less suitable for alkali-susceptible carrier materials such as silica, since the surface thereof is affected under the strongly basic conditions employed.

According to still another process a nickel-on-silica catalyst is prepared by precipitation of the nickel from an aqueous solution of a nickel salt in the form of nickel hydroxide, on the carrier material suspended in the solution, after which the solid material is separated from the aqueous solution, if necessary washed and dried and subsequently activated, in which process the nickel hydroxide is precipitated on the carrier material by intimately contacting a suspension thereof in an aqueous solution of a nickel salt with an organic base which is substantially insoluble in this solution, thus withdrawing hydrogen ions from this solution and increasing the pH thereof. This last-mentioned process yields nickel-on-silica catalysts which very favourably combine the properties discussed above, such as activity, resistance to poison, resistance to sintering, selectivity and good filterability. A disadvantage of this process, however, is that precipitation of the nickel from the aqueous solution is not entirely satisfactory.

DETAILED DESCRIPTION OF THE INVENTION

According to the invention a supported catalyst is prepared by means of a process comprising the step of precipitating nickel hydroxide on a carrier material by intimately contacting an aqueous solution of a nickel salt, a substantially water-insoluble organic base, an inorganic base which is a stronger base than said organic base, and the carrier material, thereby gradually precipitating nickel hydroxide on said carrier material.

Supported nickel catalysts prepared according to this invention have several advantages over catalysts prepared by means of the precipitation reactions known from the art and discussed above.

Thus, while activity, resistance to poison, resistance to sintering, selectivity and good filterability meet very high standards, also the degree to which the nickel is precipitated is most satisfactory. To attain these combined advantages both the substantially water-insoluble organic base and the inorganic stronger base are essential in the process of the invention. Compared with superficially similar processes: if the organic base were left out of the process no even distribution of the nickel over the carrier material would be achieved resulting in a less satisfactory behaviour of the catalyst in the catalytic processes for which it is intended; if on the other hand the inorganic base were left out of the process of preparing the catalyst, this process itself would be less economical, because too large a proportion of the nickel would remain unprecipitated.

The organic base should be substantially water-insoluble. Preferably its solubility in the aqueous solution of the nickel salt should be not greater than that of n-octyl amine.

Preferably primary or secondary alkyl amines are used, of which the alkyl groups comprise altogether at least 8 and preferably 10 to 22 carbon atoms. Examples of such amines are n-octyl amine, n-dodecyl amine, n-octadecyl amine and the like. Particularly good results were obtained by using mixtures of t-alkyl amines which are commercially available under the name of "Primene 81-R" and "Primene J.M.T.", and the t-alkyl groups of which comprise 12 to 14 and 18 to 22 carbon atoms, respectively.

Other examples of organic bases suitable to be used in the process of the invention are alkyl diamines, such as $\alpha\omega$-nonyl diamine and $\alpha\omega$-dodecyl diamine. If desired, the organic base can also be applied in a dissolved form, in which case the solvent should preferably also be substantially insoluble in the aqueous salt solution and should not react with it under the reaction conditions used. The use of such a solvent is especially important if the organic base used is solid at the reaction temperature applied. Preferred solvents are hexanol and 2-ethylhexanol.

To separate the liquid organic base from the aqueous system and the supported metal catalyst, the mixture can conveniently be heated to above 70° C. For the activity of the catalyst not to be disadvantageously affected it has been found that the support-material with precipitated metal, aqueous solution and liquid organic base should preferably be heated above 70° C for less than 5 minutes, particularly preferably for less than 2 minutes.

In principle any organic base can be used that will precipitate the metal but it has been found that, at least for supported nickel-catalysts for use in the hydrogenation of unsaturated triglycerides, sodium hydroxide is the preferred base.

The precipitation should preferably occur at a pH more alkaline than the pK of the organic base and should preferably occur from an aqueous solution containing a salt soluble at that pH and having an anion common with the anion of the water-soluble salt of the metal.

Nitrate is a preferred anion.

As starting material in the process of the invention any other nickel salt can also be used that is suficiently soluble in water. Examples of such salts are nickel chloride, nickel acetate and nickel sulphate.

When the process is applied on an industrial scale, the latter salt is also often used on account of economic considerations.

It has, however, appeared that when concentrated solutions of this salt are used, e.g. if these contain more than 5% by weight of nickel sulphate (calculated as $NiSO_4.6H_2O$), after conclusion of the precipitation sometimes difficulties arise in the separation of the solid fraction from the liquid reaction components, in that the organic base attaches itself to the solid material and can only be removed from it with difficulty. It is therefore preferred to start from a nickel sulphate solution of a lower concentration than the concentration mentioned above, although on the other hand, in order to avoid too large volumes, the concentration of this solution should preferably not be less than 1% by weight.

With respect to the carrier material it is observed that in principle any carrier material may be used, although preferably a carrier comprising silica is used with a specific surface between 5 and 750 m²/g. If such catalysts are intended for the selective hydrogenation of triglycerides derived from polyunsaturated fatty acids, it is preferred that the pore structure of this silica is such that a significant part of the pores has a diameter of more than 25 A, preferably more than 80 A.

For details of other support-materials reference is made to, for instance, the specification of Netherlands patent application No. 7,005,137.

The proportion of organic base-nickel salt should be at least equal to the stoichiometric proportion, but in general it is preferred to use an excess of the base. The molar ratio organic base/nickel salt should preferably be between 3:1 and 9:1.

The molar ratio of inorganic base/nickel salt should preferably be between 1:1 and 2.5:1. A molar ratio of less than 2:1 is especially preferred.

It has been found that in contrast with most of the known processes discussed above, in which the precipitation reaction is preferably carried out at a temperature of 90° to 100° C, the process according to the invention can also very well be carried out at lower temperatures, e.g. 10° to 50°, preferably at room temperature.

Establishing an intimate contact between the reaction components can be achieved by means of any processes which are normally used for intimately mixing mutually insoluble liquids and solids with liquids. Examples of suitable mechanical processes are: stirring, shaking or blowing through with air or other gases. In the process of the invention the mixing process, e.g. stirring, is preferably carried out so vigorously that both the carrier material and the organic base are dispersed in the aqueous solution. This condition is preferably maintained until precipitation of the nickel hydroxide on the carrier material is effected as completely as possible, and this can be checked in a simple way by quantitative or qualitative determination of the nickel ions still present in a sample of the aqueous solution.

The composition obtained after conclusion of the precipitation reaction is finally activated by processes known per se, i.e. that the nickel compound precipitated on the silica is transformed by means of a reduction into metallic nickel. This reduction can, if desired, be applied immediately to the composition obtained, but preferably the composition is first isolated from the reaction medium, washed with water and if desired with an organic solvent such as acetone or ethanol, subsequently dried and, if required, ground. Then the composition thus obtained is reduced at a temperature of 120° to 800° C, preferably 300° to 500° C, by means of hydrogen gas to yield the active nickel-on-silica catalyst, where the nickel is present in finely divided metallic form.

The quality of the catalysts thus obtained will usually rapidly deteriorate upon storage, and they very often have pyrophoric properties. For this reason it is preferred to work up the catalysts, e.g. for storage or with a view to selling, in the form of the non-activated composition and to subject this composition to an activation treatment only immediately before use. It will be clear that the invention also relates to the preparation of these non-activated compositions.

An additional advantage of the invention is that the organic base (recovered after separation by conventional means of organic material from the aqueous phase after precipitation of the nickel) plus any salts of this base and the anion of the nickel salt used which has been recovered simultaneously, is directly re-usable in the process of catalyst preparation according to the invention.

The process is preferably carried out continuously.

The process will now be illustrated by the following examples:

In the following experiments the sesame activity is determined, cf. J. W. E. Coenen, Thesis Delft (Netherlands) 1964, and B. G. Linsen, Thesis Delft (Netherlands) 1967 p. 82, by assessing the drop in refractive index on hardening standard sesame oil under standard conditions (175° C and $H_2$ flow of 60 l/h), using such an amount of catalyst that 0.025% of nickel, calculated on the oil, is present, using a standard catalyst as a reference. Thus $$\text{Sesame activity} = \frac{\text{drop refractive index with sample}}{\text{drop refractive index with standard}} \times 100$$

The standard catalyst used showed a drop in refractive index under those conditions of 0.0042.

The term "nickel consumption" as used in the following experiments denotes the minimum quantity of nickel expressed as necessary to harden a standard whale oil having a sulphur content of 30 p.p.m. under standard conditions (175° C and $H_2$ flow of 60 l/h) until a product is obtained having a refractive index of $n_D^{65} = 1.4480$ without regard to reaction time.

The selectivity is determined by hydrogenating standard soybean oil under standard conditions (100° C, $H_2$ flow 60 l/h) until a refractive index $n_D^{65} = 1.4535$ (iodine value of 90) is reached. The standard melting dilatation at 30° C ($D_{30}$) (determined of H. A. Boekenoogen, "Analysis and Characterization of Oils, Fats and Fat Products", London, New York, Sydney, 1969, Vol 1, p 144) is taken as a measure for selectivity using a sceale varying from $D_{30}=0$–50 (highly selective) to $D_{30} > 250$ (non-selective).

EXAMPLES I–II AND EXAMPLE A

In a continuous process the following solutions were intimately contacted in a reaction vessel (residence time 15 minutes) in the proportions appearing from Table I.

An aqueous solution containing:
37.5 g/l $NiNO_3.6$ Aq 43.8 g/l NaNO$_3$
25 g/l kieselguhr (12S)

An alkaline solution containing 60 g/l NaOH in water. An organic phase containing 350 g/tg Primene J.M.T. in 2-ethyl-hexanol.

The temperature in the reaction vessel was 20° C. After leaving the reaction vessel the mixture was separated into an aqueous phase and an organic phase. The green cake was separated from the aqueous phase by filtration leaving a first filtrate. The green cake was washed with water, dried for 18 hours at 120° C and reduced with H$_2$ at 450° C.

The results were as follows:

Table I

|  | Molar ratio Primene/Ni | Molar ratio NaOH/Ni | p.p.m.Ni in 1st filtrate | Sesame Activity | Selectivity D$_{20}$ | D$_{30}$ | I.V. |
|---|---|---|---|---|---|---|---|
| Example A | 7 | 0 | 184 | 170 | 215 | 80 | 89 |
| I | 7 | 1.8 | 30 | 180 | 190 | 75 | 90 |
| II | 4 | 1.8 | 46 | 170 |  |  |  |

EXAMPLES III–VIII AND EXAMPLES B AND C

In a continuous process the same solutions were intimately contacted as in the foregoing examples with the exception that this time hexanol was used as the solvent for the organic phase. After leaving the reaction vessel but before separation the mixture was led in some experiments through a heat exchanger (70°–90° C) (residence time 1–2 min.). Further the process was as described for the foregoing experiments. This time, however, the molar ratio Primene/Ni was kept constant at 8.5. The temperature at which precipitation took place was 20° C.

The results were as follows:

Table II

|  | Molar ratio NaOH/Ni | p.p.m.Ni in 1st filtrate | Sesame Activity | Selectivity D$_{20}$ | D$_{30}$ | I.V. | % Nickel Consumption | heat exchanger used? |
|---|---|---|---|---|---|---|---|---|
| Ex B | 0 | 100 | 184 | 215 | 90 | 0.5 | 70 | — |
| Ex III | 1 | 15 | 150 |  |  |  |  | — |
| Ex IV | 1.8 | <5 | 179 | 225 | 105 | 89.0 | 79 | — |
| Ex V | 2.2 | <5 | 145 |  |  |  |  | — |
| Ex C | 0 | 345 | 184 | 235 | 105 | 89.0 |  | + |
| Ex VI | 1 | 50 | 180 |  |  |  |  | + |
| Ex VII | 1.8 | 6 | 172 | 240 | 110 | 89.3 | 71 | + |
| Ex VIII | 2.2 | <5 | 55 |  |  |  |  | + |

What is claimed is:

1. In a process for the preparation of a supported nickel catalyst wherein nickel in the form of nickel hydroxide, is precipitated from an aqueous solution of a nickel salt, onto a carrier material suspended in said solution after which the combined material is separated from said aqueous solution, the improvement which comprises the step of intimately contacting said carrier material with an aqueous solution of said nickel salt, an organic base selected from the group consisting of primary and secondary alkyl amines and containing in the alkyl groups a total of at least 8 carbon atoms; t-alkyl amines, the t-alkyl groups of which contain 18 to 22 carbon atoms; and alkyl diamines the alkyl group of which contain 9 to 12 carbon atoms; said organic base having a solubility not greater than that of n-octyl amine in said aqueous solution; and sodium hydroxide; thereby gradually precipitating said nickel hydroxide onto said carrier material.

2. A process as claimed in claim 1 in which the aqueous solution of said nickel salt additionally contains a salt having an anion common with the anion of the water-soluble nickel salt.

3. A process as claimed in claim 1 in which the organic base is dissolved in an organic solvent that is substantially insoluble in the aqueous salt solution and that does not react with it under the reaction conditions employed.

4. A process as claimed in claim 1 wherein the nickel salt is nickel sulphate and in which the concentration calculated as NiSO$_4$.6H$_2$O in the aqueous solution is 1 to 5 per cent by weight.

5. A process as claimed in claim 1 in which the carrier material comprises silica with a specific surface of 5 to 750 m$^2$/g.

6. A process as claimed in claim 1 in which the silica has a significant part of its pores with a diameter of more than 25 A.

7. A process as claimed in claim 1 in which the support material with precipitated metal, aqueous solution and organic base, is heated to above 70° C for less than 5 minutes.

* * * * *

UNITED STATES PATENT AND TRADEMARK OFFICE
CERTIFICATE OF CORRECTION

PATENT NO. : 3,997,475
DATED : December 14, 1976
INVENTOR(S) : Hendrik Theodorus Rijnten, et al.

It is certified that error appears in the above–identified patent and that said Letters Patent are hereby corrected as shown below:

In the claims:

Claim 6, column 8, line 50: "in claim 1" should read -- in claim 5 --.

Signed and Sealed this

Eighth Day of March 1977

[SEAL]

Attest:

RUTH C. MASON
*Attesting Officer*

C. MARSHALL DANN
*Commissioner of Patents and Trademarks*